United States Patent
Hwang et al.

(10) Patent No.: US 9,843,284 B2
(45) Date of Patent: Dec. 12, 2017

(54) SYSTEM FOR CONTROLLING FAULT TOLERANCE

(71) Applicant: SAMSUNG ELECTRONICS CO., LTD., Suwon-si, Gyeonggi-do (KR)

(72) Inventors: Young-Ho Hwang, Hwaseong-si (KR); Jang-Hwan Kim, Suwon-si (KR); Sang-Yoon Soh, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 467 days.

(21) Appl. No.: 14/583,243

(22) Filed: Dec. 26, 2014

(65) Prior Publication Data

US 2016/0006376 A1    Jan. 7, 2016

(30) Foreign Application Priority Data

Jul. 4, 2014 (KR) .................. 10-2014-0083702

(51) Int. Cl.
*H02P 23/00* (2016.01)
*H02P 27/06* (2006.01)
*H02P 29/032* (2016.01)

(52) U.S. Cl.
CPC ............ *H02P 27/06* (2013.01); *H02P 29/032* (2016.02)

(58) Field of Classification Search
CPC ........... H02P 4/00; H02P 29/032; H02P 27/06
USPC ...................................................... 318/504
See application file for complete search history.

(56) References Cited

U.S. PATENT DOCUMENTS

| | | | | |
|---|---|---|---|---|
| 6,158,553 A | * | 12/2000 | Oshima | H02P 25/22 187/293 |
| 7,009,856 B2 | * | 3/2006 | Moon | B60L 11/14 363/37 |
| 8,294,408 B2 | * | 10/2012 | Matt | H02M 7/5387 318/727 |
| 8,604,733 B2 | * | 12/2013 | Liegeois | H02M 7/49 318/400.01 |
| 2008/0258661 A1 | | 10/2008 | Nagashima et al. | |
| 2009/0167234 A1 | * | 7/2009 | Uechi | B60W 30/192 318/800 |
| 2012/0013193 A1 | | 1/2012 | Sato et al. | |
| 2012/0161681 A1 | * | 6/2012 | Kuroda | B62D 5/0481 318/400.21 |

(Continued)

FOREIGN PATENT DOCUMENTS

| | | |
|---|---|---|
| KR | 0559330 | 3/2006 |
| KR | 0740336 B1 | 7/2007 |
| KR | 101198638 B1 | 11/2012 |

*Primary Examiner* — Eduardo Colon Santana
*Assistant Examiner* — Gabriel Agared
(74) *Attorney, Agent, or Firm* — Volentine & Whitt, PLLC

(57) ABSTRACT

A system for controlling fault tolerance may include a first controller connected to a driver, a first switch connected in parallel to the first controller, a first capacitor connected in parallel to the first switch, a second switch connected in parallel to the first capacitor and different from the first switch, a first power supply connected in parallel to the first capacitor and connected in series to the second switch, and a second capacitor connected to the first switch and a ground of the first power supply and different from the first capacitor. When the first controller is broken down, the second switch may be turned off to interrupt power supply from the first power supply, and the first switch may be turned on to discharge electric charges charged in the second capacitor.

18 Claims, 12 Drawing Sheets

(56) References Cited

U.S. PATENT DOCUMENTS

2013/0063059 A1 3/2013 Chi et al.
2013/0242623 A1 9/2013 Wei et al.
2013/0268106 A1* 10/2013 Mitani .................. B24B 37/013
                                                        700/121

* cited by examiner

SYSTEM FOR CONTROLLING FAULT TOLERANCE

CROSS-REFERENCE TO RELATED APPLICATION

A claim of priority is made to Korean Patent Application No. 10-2014-0083702 filed on Jul. 4, 2014, in the Korean Intellectual Property Office, and all the benefits accruing therefrom under 35 U.S.C. 119, the contents of which in its entirety are herein incorporated by reference.

BACKGROUND

The present disclosure relates to a system for controlling fault tolerance.

In order to adopt fault tolerance controlling technology, it is necessary to utilize a modified control system relative to that used in an ordinary motor drive system. For example, a multi-winding based motor and multiple controllers mounted outside the motor may be required. In addition, in order to dump energy charged during a process of separating a broken controller from the system, an additional dynamic brake may be required. These and other modifications can substantially increase costs.

SUMMARY

According to an aspect of the present disclosure, there is provided a control system for controlling fault tolerance. The control system may include a first controller connected to a driver, a first switch connected in parallel to the first controller, a first capacitor connected in parallel to the first switch, a second switch connected in parallel to the first capacitor and different from the first switch, a first power supply connected in parallel to the first capacitor and connected in series to the second switch, and a second capacitor connected to the first switch and a ground of the first power supply and different from the first capacitor. When the first controller is broken down, the second switch may be turned off to interrupt power supply of the first power supply, and the first switch may be turned on to discharge electric charges charged in the second capacitor.

The first switch may include a transistor.

A gate terminal of the transistor may be connected to one end of the second capacitor, and a drain terminal of the transistor may be connected to the other end of the second capacitor.

The gate terminal of the transistor and one end of the second capacitor may be connected to a ground of the first power supply.

The control system may further comprise a diode having one end connected to the gate terminal and the other end connected to a ground of the first power supply.

The control system may further comprise a second controller connected to the driver and different from the first controller, a third switch connected in parallel to the second controller, a third capacitor connected in parallel to the third switch, a fourth switch connected in parallel to the third capacitor and different from the third switch, and a second power supply connected in parallel to the third capacitor and connected in series to the fourth switch.

The control system may further comprise a fourth capacitor connected to the third switch and a ground of the second power supply and different from the third capacitor.

Each of the first controller and the second controller may include a transistor element.

The control system may further comprise a switch controller controlling the first to fourth switches.

The switch controller may receive a fault signal from the first or second controller.

According to another aspect of the present disclosure, there is provided a control system for controlling fault tolerance. The control system may include a driver, first and second controllers controlling the driver, a first switch connected in parallel to the first controller, a first capacitor connected in parallel to the first switch, a second switch connected in parallel to the first capacitor and different from the first switch, a first power supply connected in parallel to the first capacitor and connected in series to the second switch, a third switch connected in parallel to the second controller, a second capacitor connected in parallel to the third switch, a fourth switch connected in parallel to the second capacitor and different from the third switch, and a second power supply connected in parallel to the second capacitor and connected in series to the fourth switch. When the first controller is broken down and the second controller normally operates, the second switch may be turned off to interrupt power supply of the first power supply, the first switch may be turned on to discharge electric charges charged in the second capacitor, the third switch may be maintained in an 'OFF' state, and the fourth switch may be maintained in an 'ON' state.

According to still another aspect of the present disclosure, there is provided a control system for controlling fault tolerance. The control system may include a driver, first and second controllers controlling the driver, first and second switches connected in parallel to the first controller, third and fourth switches connected in parallel to the second controller, a torque table generating a first signal to determine an amount of current to be supplied to the driver based on an externally applied torque signal, a current controller receiving the first signal and generating a second signal to determine a voltage command required by the driver, and a switch controller controlling the first to fourth switches. The torque table and the current controller may receive fault signals from the first or second controller, and may be updated.

The control system may further comprise a power distributor receiving the second signal and generating a third signal to determine a voltage command of the driver to be distributed to the first and second controllers. The third signal may include a 3-phase signal.

The control system may further comprise a coordinate converter converting the third signal into a fourth signal. The fourth signal may include a rotation coordinate signal.

The control system may further comprise a driving controller receiving the fourth signal and generating a fifth signal. The fifth signal may control driving of the first and second controllers.

BRIEF DESCRIPTION OF THE DRAWINGS

The above and other aspects and features of the present disclosure will become apparent from the detailed description that follows, with reference to the attached drawings, in which.

DETAILED DESCRIPTION OF EMBODIMENTS

Figure 1:
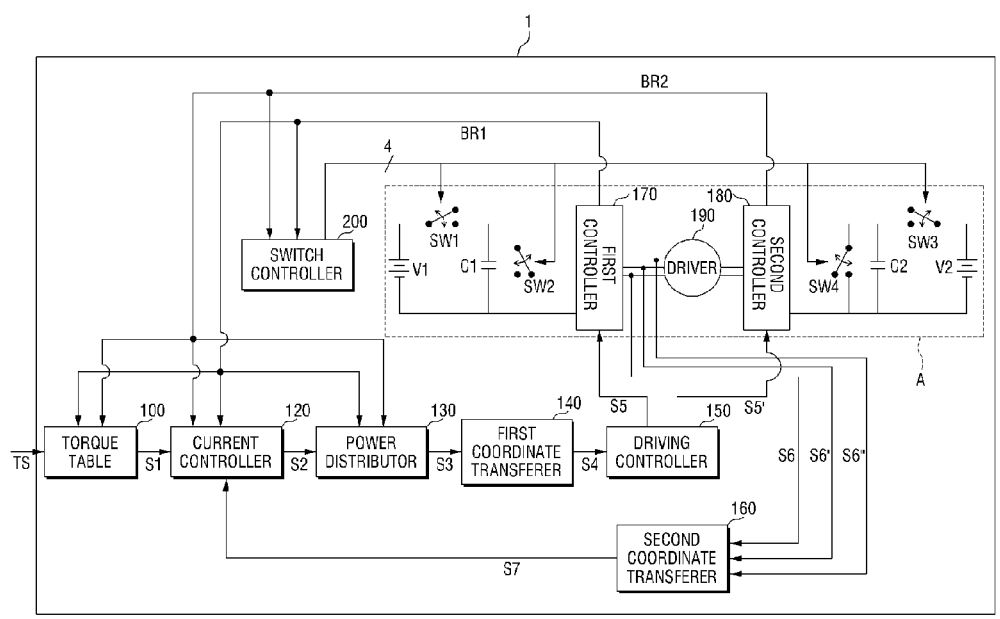
FIG. 1 is a block diagram illustrating a fault tolerance control system according to an embodiment of the present disclosure.

Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the present disclosure to those skilled in the art, and the present disclosure will only be defined by the appended claims. Like reference numerals refer to like elements throughout the specification.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, a fault tolerance control system according to an embodiment of the present disclosure will be described with reference to FIGS. 1 and 2.

Figure 2:
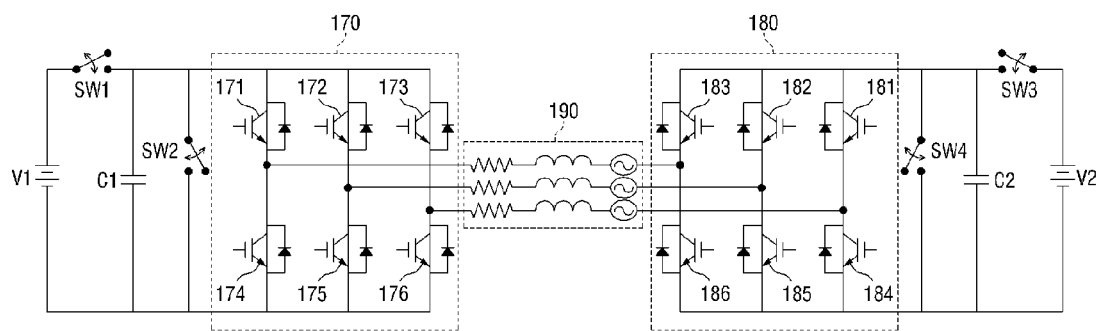
FIG. 2 is a diagram showing a circuit example of a portion 'A' of FIG. 1.

FIG. 1 is a block diagram illustrating a fault tolerance control system according to an embodiment of the present disclosure, and FIG. 2 is a diagram illustrating a circuit example of a portion 'A' of FIG. 1.

Referring to FIG. 1, the fault tolerance control system 1 according to an embodiment of the present disclosure may include a torque table 100, a current controller 120, a power distributor 130, a first coordinate converter 140, a driving controller 150, a second coordinate converter 160, a first controller 170, a second controller 180, a driver 190, a switch controller 200, first to fourth switches SW1 to SW4, first and second power supplies V1 and V2, and first and second capacitors C1 and C2.

The torque table 100 may generate a first signal S1 in order to determine an amount of current that is supplied to the driver 190, based on an externally applied torque signal TS. In addition, the torque table 100 may provide the first signal S1 to the current controller 120.

In detail, the torque table 100 may receive the torque signal TS from the outside. Here, the outside may mean a user, an electronic device or an electronic system, but not limited thereto. In addition, the torque signal TS may include information concerning a torque required to rotate the driver 190, and the first signal S1 may include information concerning an appropriate amount of current relative to the torque required to rotate the driver 190.

In addition, the torque table 100 may receive fault signals BR1 and BR2 from the first controller 170 or the second controller 180, and may be updated. That is to say, the torque table 100 may receive the fault signals BR1 and BR2, and may change content of the first signal determining the amount of current required by the driver 190, which will later be described in detail. In addition, the fault signals BR1 and BR2 may include information on whether the first and second controllers 170 and 180 are broken down or not.

The current controller 120 may receive the first signal S1 to generate a second signal S2 determining a voltage command required by the driver 190. In addition, current controller 120 may provide the second signal S2 to the power distributor 130.

In detail, the current controller 120 may determine a voltage required by the driver 190 based on the first signal S1. That is to say, the second signal S2 may include information concerning a voltage relative to an amount of current required to drive the driver 190.

In addition, the current controller 120 may receive the fault signals BR1 and BR2 from the first controller 170 or the second controller 180, and may be updated. That is to say, the current controller 120 may receive the fault signals BR1 and BR2, and may change content of the second signal S2 which determines the voltage required by the driver 190.

The power distributor 130 may receive the second signal S2, and may generate a third signal S3 determining the voltage command of the driver 190 in order to be distributed to the first and second controllers 170 and 180. In addition, the power distributor 130 may provide the third signal S3 to the first coordinate converter 140.

In detail, the power distributor 130 may determine how much power output from the driver 190 is to be distributed to the first and second controllers 170 and 180, based on the second signal S2. That is to say, the third signal S3 may include information on how much power output from the driver 190 is to be distributed to the first and second controllers 170 and 180.

In addition, the power distributor 130 may receive the fault signals BR1 and BR2 from the first controller 170 or the second controller 180, and may be updated. That is to say, the current controller 120 may receive the fault signals BR1 and BR2, and may change content of the third signal S3 determining how much power output from the driver 190 is to be distributed to the first and second controllers 170 and 180.

The first coordinate converter 140 may convert the third signal S3 into a fourth signal S4.

In detail, the first coordinate converter 140 may receive the third signal S3 from the power distributor 130, and may convert the third signal S3 into the fourth signal S4. In addition, the first coordinate converter 140 may provide the fourth signal S4 to the driving controller 150.

Here, the fourth signal S4 may include, for example, a 3-phase signal. The 3-phase signal may be a signal represented by, for example, x, y, and z (3 states or 3 directions), including a rotation coordinate signal. The rotation coordinate signal may include, for example, a signal represented by θ (indicating rotation or stop).

The driving controller 150 may receive the fourth signal S4, and may generate a fifth signal S5 and a fifth-prime signal S5'.

In detail, the driving controller 150 may receive the fourth signal S4 from the first coordinate converter 140, and may generate the fifth signal S5 and the fifth-prime signal S5'. In addition, the driving controller 150 may provide the fifth signal S5 and the fifth-prime signal S5' to the first controller 170 and the second controller 180, respectively.

Here, the fifth signal S5 and the fifth-prime signal S5' may control the first controller 170 and the second controller that are to be driven, respectively.

The second coordinate converter 160 may receive a sixth signal S6, a sixth-prime signal S6' and a sixth-double prime signal S6" from the driver 190, and may convert the same into a seventh signal S7. In addition, the second coordinate converter 160 may provide the seventh signal S7 to the current controller 120.

In detail, each of the sixth signal S6, the sixth-prime signal S6' and the sixth-double prime signal S6" may include information concerning the amount of current flowing in the driver 190. Here, the amount of current flowing in the driver 190 may be represented by three signals, that is, the sixth signal S6, the sixth-prime signal S6' and the sixth-double prime signal S6" because the driver 190 comprises three lines, as shown in FIG. 2, and the sixth signal S6, the sixth-prime signal S6' and the sixth-double prime signal S6" represent amounts of current flowing in the respective lines. However, the number of lines constituting the driver 190 is not limited to three, and fewer than or greater than three lines may constitute the driver 190. In addition, the number of signals provided to the second coordinate converter 160 may vary according to the number of lines constituting the driver 190.

Meanwhile, each of the sixth signal S6, the sixth-prime signal S6' and the sixth-double prime signal S6" may be a rotation coordinate signal including, for example, a signal represented by θ (indicating rotation or stop).

Therefore, the second coordinate converter 160 may convert the sixth signal S6, the sixth-prime signal S6' and the sixth-double prime signal S6" into the seventh signal S7 that is a 3-phase signal, e.g., a signal represented by x, y, and z (3 states or 3 directions).

That is to say, the amount of current flowing in the driver 190 may be fed back to the current controller 120 through the second coordinate converter 160, so that the current controller 120 can keep generating the second signal S2 based on the amount of current to be supplied to the driver 190.

The first controller 170 may control the driver 190. In addition, the first controller 170 may be an inverter, but not limited thereto.

In detail, the first controller 170 connected to the driver 190 may control the driver 190, and may be connected in parallel to the second switch SW2. In addition, the first controller 170 may receive the fifth signal S5 from the driving controller 150, and may be driven with the fifth signal S5. If there is a fault, the first controller 170 may provide the first fault signal BR1 to the switch controller 200, the torque table 100, the current controller 120 and the power distributor 130. In addition, the first controller 170 may include a plurality of transistor elements (e.g., transistors 171, 172, 173, 174, 175 and 176).

Here, the second switch SW2 may include, for example, a transistor. In addition, the second switch SW2 may be connected to a third capacitor (C3 of FIG. 6), which will later be described in detail.

The second switch SW2 may be connected in parallel to the first capacitor C1. In addition, the first capacitor C1 may be connected in parallel to the first power supply V1 and the first switch SW1. The first power supply V1 and the first switch SW1 may be connected in series to each other.

The second controller 180 may control the driver 190. In addition, the second controller 180 may be an inverter, but not limited thereto.

In detail, the second controller 180 connected to the driver 190 may control the driver 190, and may be connected in parallel to the fourth switch SW4. In addition, the second controller 180 may receive the fifth-prime signal S5' from the driving controller 150, and may be driven with the fifth-prime signal S5'. If there is a fault, the second controller 180 may provide the second fault signal BR2 to the switch controller 200, the torque table 100, the current controller 120 and the power distributor 130. In addition, the second controller 180 may include a plurality of transistor elements (e.g., transistors 181, 182, 183, 184, 185 and 186).

Here, the fourth switch SW4 may include, for example, a transistor. In addition, the fourth switch SW4 may be connected to a fourth capacitor (not shown), like the second switch SW2, which will later be described with reference to FIG. 6 regarding the second switch SW2.

The fourth switch SW4 may be connected in parallel to the second capacitor C2. In addition, the second capacitor C2 may be connected in parallel to the second power supply V2 and the third switch SW3. The second power supply V2 and the third switch SW3 may be connected in series to each other.

In addition, the first to fourth switches SW1 to SW4 may be different from one another.

Referring to FIG. 1, the driver 190 may be connected to the first and second controllers 170 and 180. In addition, the driver 190 may include, for example, a motor, but not limited thereto.

In detail, the driver 190 may be controlled by the first and second controllers 170 and 180. In addition, since the first and second controllers 170 and 180 control the driver 190 as dual inverters, even if one of the first and second controllers 170 and 180 is broken down, the driver 190 may be controlled by the other that is not broken down.

Here, referring to FIG. 2, as described above, each of the first controller 170 and the second controller 180 may include a plurality of transistor elements. The driver 190 may comprise three lines, and may drive the first to fourth switches SW1 to SW4. However, aspects of the present disclosure are not limited thereto. The number of transistor elements and the number of lines included in the driver 190, as shown in FIG. 2, may vary.

The switch controller 200 may control the first to fourth switches SW1 to SW4.

In detail, the switch controller 200 may receive the first fault signal BR1 or the second fault signal BR2 from the first controller 170 or the second controller 180. That is to say, when the switch controller 200 receives the first fault signal BR1 from the first controller 170, the switch controller 200 may turn off the first switch SW1 and turn on the second switch SW2. In addition, when the switch controller 200 receives the second fault signal BR2 from the first controller 170, the switch controller 200 may turn off the third switch SW3 and turn on the fourth switch SW4. Here, the turned-on state of a switch may mean that the switch is in a short state, and the turned-off state of a switch may mean that the switch is in an open state.

Hereinafter, operations of first to fourth switches shown in FIG. 2 will be described with reference to FIGS. 3 to 5.

Figure 3:
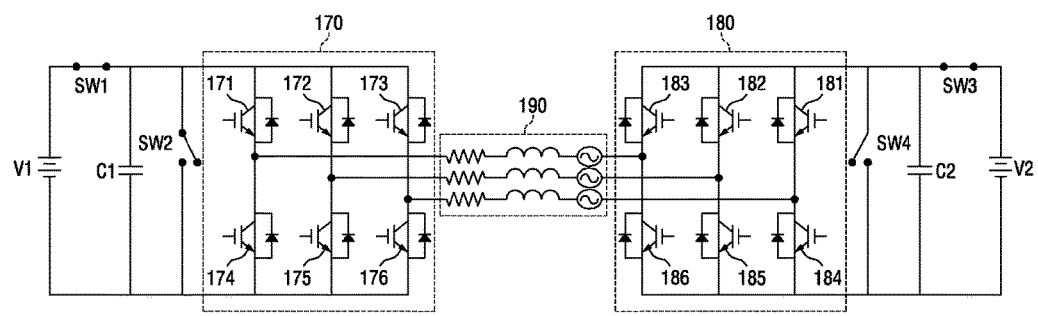
FIGS. 3, 4 and 5 are circuit diagrams for reference in describing operations of first to fourth switches shown in FIG. 2.
Figure 4:
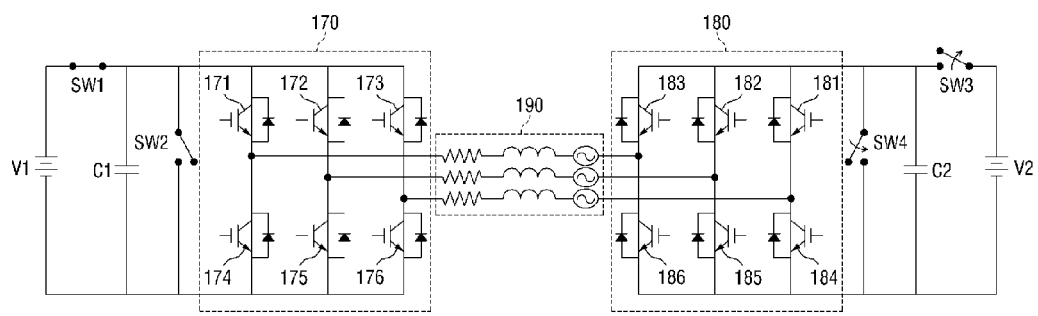
Figure 5:
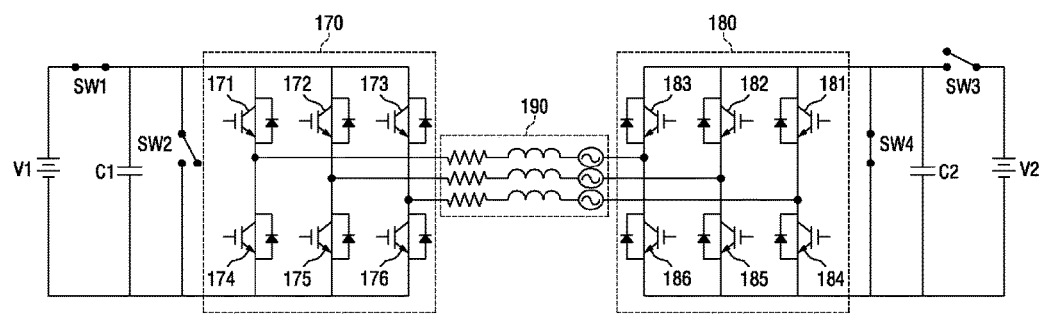

FIGS. 3 to 5 are circuit diagrams for reference in describing operations of first to fourth switches shown in FIG. 2.

Referring to FIG. 3, states of the first to fourth switches SW1 to SW4 in the case where the first and second controllers 170 and 180 are broken down are illustrated.

In detail, when the first and second controllers 170 and 180 are broken down, the first and third switches SW1 and SW3 may be turned on, and the second and fourth switches SW2 and SW4 may be turned off. Therefore, the energy generated from the first power supply V1 may be supplied to the driver 190 through the first controller 170, and the energy generated from the second power supply V2 may be supplied to the driver 190 through the second controller 180.

Referring to FIG. 4, states of the first to fourth switches SW1 to SW4 in the case where the second controller 180 is broken down are illustrated.

In detail, since the first controller 170 is not broken down, the switch controller (200 of FIG. 1) may maintain the first switch SW1 in an 'ON' state, and the second switch SW2 in an 'OFF' state. However, since the second controller 180 is broken down, the switch controller (200 of FIG. 1) may change the state of the third switch SW3 into an 'OFF' state, and the state of the fourth switch SW4 into an 'ON' state, thereby interrupting the flow of current flowing between the second power supply V2 and the second controller 180. That is to say, when the second controller 180 is broken down and the first controller 170 normally operates, the third switch SW3 may be turned off in order to interrupt power supply from the second power supply V2, the fourth switch SW4 may be turned on in order to discharge electric charges charged in the second capacitor C2, the second switch SW2 may be maintained in the 'OFF' state, and the first switch SW1 may be maintained in the 'ON' state, which will later be described in more detail.

Referring to FIG. 5, a current path between the second controller 180 and the second power supply V2 may be cut off, and the current path may be formed by built-in diodes of the first controller 170, the driver 190 and the second controller 180 that are normally operating by the first power supply V1. In such a manner, the current path can be controlled.

Hereinafter, changes in the current and voltage depending on operations of third and fourth switches shown in FIG. 4 will be described with reference to FIGS. 6 and 7. The first and second switches shown in FIG. 2 may operate in the same manner with the third and fourth switches shown in FIG. 4.

Figure 6:
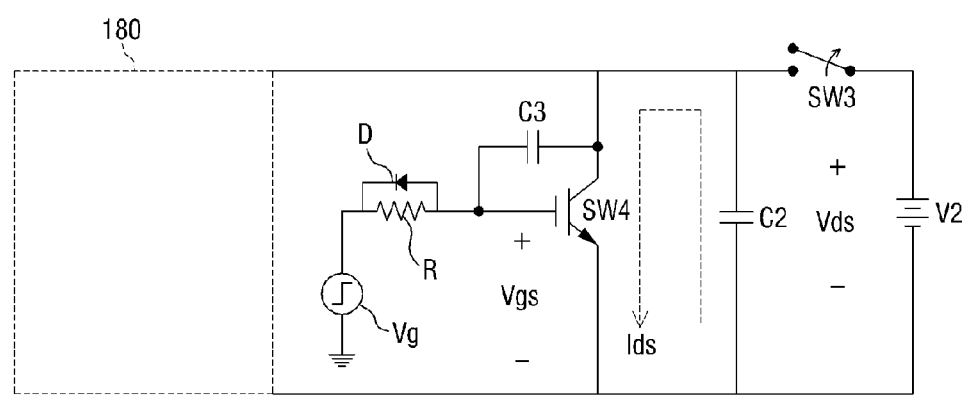
FIGS. 6 and 7 are diagrams for reference in describing changes in current and voltage depending on operations of third and fourth switches shown in FIG. 4.
Figure 7:
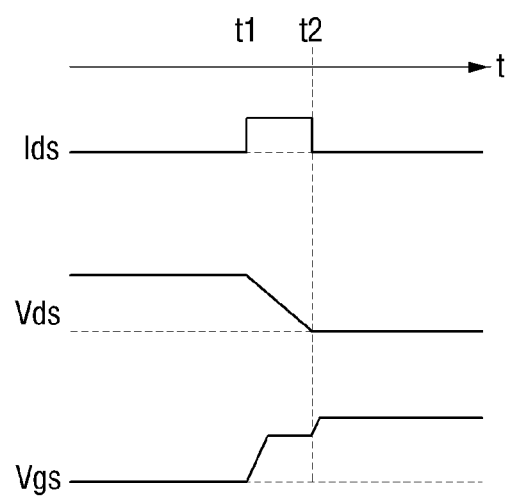

FIGS. 6 and 7 are diagrams for reference in describing changes in current and voltage depending on operations of third and fourth switches shown in FIG. 4. For purposes of description, it is assumed that the fourth switch SW4 is a transistor.

Referring to FIG. 6, the fourth switch SW4 may be a transistor (e.g., NMOS), a gate terminal of the fourth switch SW4 may be connected to one end of the third capacitor C3 and a drain terminal of the fourth switch SW4 may be connected to the other end of the third capacitor C3.

In addition, the gate terminal of the fourth switch SW4 and the one end of the third capacitor C3 may be connected to the ground of the second power supply V2. In more detail, the fourth switch SW4 may form the current path connected to the ground of the second power supply V2 together with a diode D, a resistor R, and a gate voltage source Vg.

In addition, the diode D may have one end connected to the gate terminal of the fourth switch SW4 and the other end connected to the ground of the second power supply V2.

In addition, although not shown, the switch controller (200 of FIG. 1) may control a voltage of the gate voltage source Vg, thereby controlling the fourth switch SW4 to be turned on/off, which may also be a controlling method of the switch controller (200 of FIG. 1) for the other switches (i.e., the first to third switches SW1 to SW3).

Consequently, when an operating voltage Vgs of the fourth switch SW4 sharply increases, a discharge current Ids of the second capacitor C2 may sharply increase to cause damages to a circuit. Therefore, the third capacitor C3 may be additionally provided between the gate and drain of the fourth switch SW4, thereby preventing the discharge current Ids of the second capacitor C2 from sharply increasing by slowly increasing the operating voltage Vgs of the fourth switch SW4.

Referring to FIG. 7, with the third capacitor C3 additionally provided, the operating voltage Vgs of the fourth switch SW4 may slowly increase, thereby limiting the discharge current Ids of the second capacitor C2. That is to say, although not shown, if the third capacitor C3 is not additionally provided, a larger amount of discharge current Ids may flow during a time interval shorter than a time interval between a time t1 and a time t2, resulting in circuit damages.

Figure 8:
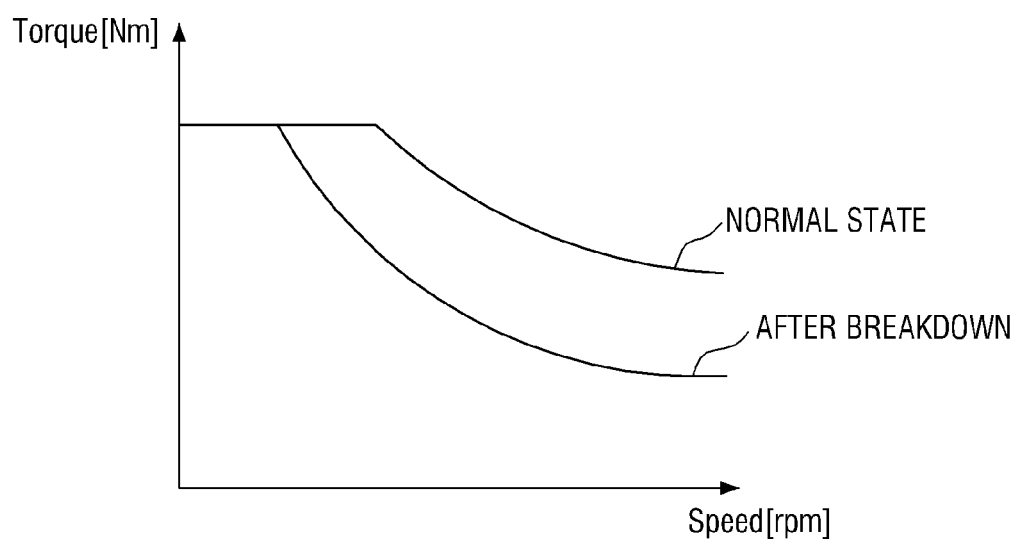
FIG. 8 is a graph illustrating an example of a torque-speed relationship when one of first and second controllers is broken down.

FIG. 8 is a graph illustrating an example of a torque-speed relationship when one of first and second controllers is broken down.

Referring to FIG. 8, after breakdown of one of the first and second controllers 170 and 180, the fault tolerance control system 1 shown in FIG. 1 may have a limited driving capability of approximately 50% of the driving capability in normal states of the first and second controllers 170 and 180.

That is to say, since characteristics of the fault tolerance control system 1 are varied before and after breakdown, the fault tolerance control system 1 shown in FIG. 1 may require the torque table (100 of FIG. 1) and the current controller 120 to reflect the varied characteristics. Therefore, as shown in FIG. 1, when the first and second controllers 170 and 180 are broken down, the fault signals BR1 and BR2 may be provided to the torque table 100, the current controller 120 and the power distributor 130, thereby enabling optimal control of fault tolerance by varying the torque table and current controlling parameters.

Hereinafter, a method of detecting a fault of a switch additionally installed to control the fault tolerance will be described with reference to FIGS. 9 to 12.

FIGS. 9 to 12 are diagrams for reference in describing a method of detecting a fault of a switch additionally installed to control the fault tolerance. Since a pair of first and second switches SW1 and SW2 and a pair of third and fourth switches SW3 and SW4 operate under the same principle, the method of detecting a fault will be described with regard to the first and second switches SW1 and SW2 by way of example. That is to say, the method of detecting faults from the first and second switches SW1 and SW2 and the method of detecting faults from the third and fourth switches SW3 and SW4 are the same with each other.

First, referring to FIG. 9, when the first and second switches SW1 and SW2 are not broken down, a change in the voltage applied to the first capacitor (C1 of FIG. 1) (to be referred to as a first capacitor voltage Vc1, hereinafter) is illustrated.

First, during the time interval between t1 and t2, if the first switch SW1 is maintained in an OFF state and the second switch SW2 is changed into an ON state, electric charges charged in the first capacitor (C1 of FIG. 1) may be discharged, and the first capacitor voltage Vc1 may decrease. Thereafter, if the second switch SW2 is changed back into an OFF state during a time interval between t2 and t3, the first capacitor (C1 of FIG. 1) may not be discharged any more, and the first capacitor voltage Vc1 may be maintained at a constant level. In addition, if the first switch SW1 is changed into an ON state during a time interval between t3 and t4, the electric charges supplied from the first power supply (V1 of FIG. 1) may charge the first capacitor (C1 of FIG. 1), and the first capacitor voltage Vc1 may increase again. In such a manner, the change in the first capacitor voltage Vc1, which is the same as described above, may also be observed when the first and second switches SW1 and SW2 are driven during a time interval between t4 and t6.

Figure 9:
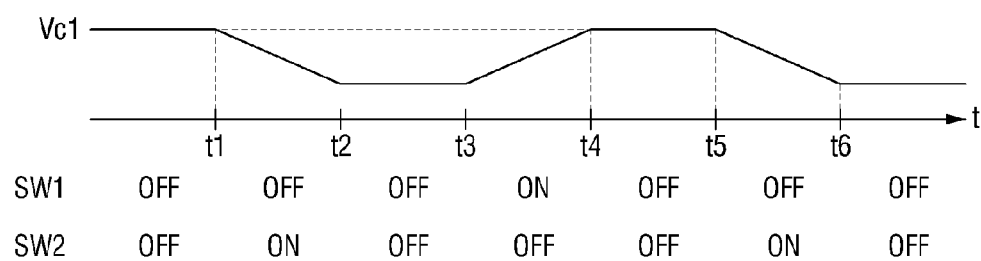
FIGS. 9, 10, 11 and 12 are diagrams for reference in describing a method of detecting a fault of a switch additionally installed to control fault tolerance.

Consequently, since the first and second switches SW1 and SW2 normally operate, such a change in the first capacitor voltage Vc1 as shown in FIG. 9 may be observed. That is to say, it is possible to detect whether there are faults in the first and second switches SW1 and SW2 or not by observing the change in the first capacitor voltage Vc1 according to the ON/OFF state of the first and second switches SW1 and SW2.

Figure 10:
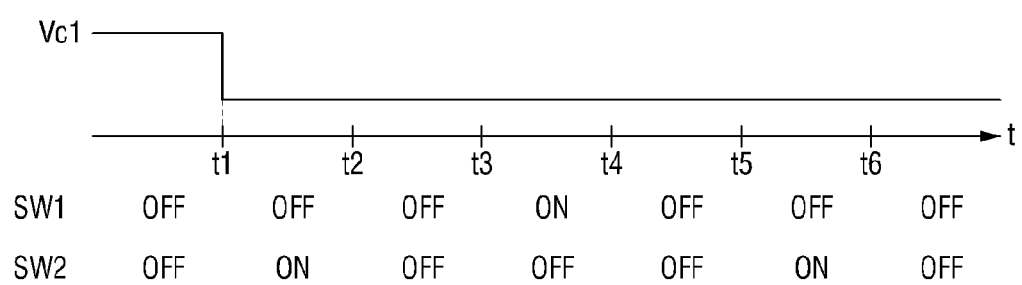

Referring to FIG. 10, a change in the first capacitor voltage Vc1 in the case where the first switch SW1 is broken down due to a short state at time t1 is illustrated.

First, since the first switch SW1 is broken down due to a short at time t1, it is confirmed that the first capacitor voltage Vc1 is sharply reduced. Therefore, even when the first and second switches SW1 and SW2 are turned on or off after time t2, a change in the first capacitor voltage Vc1 may not be observed.

That is to say, in FIG. 10, a normal change in the first capacitor voltage Vc1, as shown in FIG. 9, may not be observed, thereby detecting a fault of the first switch SW1.

Figure 11:
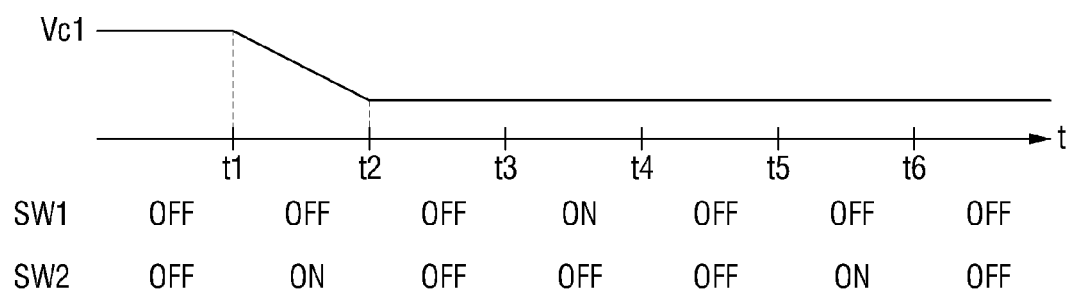

Referring to FIG. 11, a change in the first capacitor voltage Vc1 in the case where the first switch SW1 is broken down due to an open state at time t3 is illustrated.

First, when the first switch SW1 is maintained in an OFF state during the time interval between t1 and t2 and the second switch SW2 is changed into an ON state, the electric charges charged in the first capacitor (C1 of FIG. 1) may be discharged and the first capacitor voltage Vc1 may be reduced. Thereafter, if the second switch SW2 is changed back into an OFF state during the time interval between t2 and t3, the first capacitor (C1 of FIG. 1) may not be discharged any more, and the first capacitor voltage Vc1 may be maintained at a constant level. However, since the first switch SW1 is broken down due to an open state at time t3, the first capacitor voltage Vc1 may not be increased, irrespective of whether the first switch SW1 is changed into an ON state. That is to say, even when the first and second switches SW1 and SW2 are turned on or off after time t3, a change in the first capacitor voltage Vc1 may not be observed.

Consequently, in FIG. 11, a normal change in the first capacitor voltage Vc1, as shown in FIG. 9, may not be observed, thereby detecting a fault of the first switch SW1.

In addition, even when the second switch SW2 is shorted at time t3, the change in the first capacitor voltage Vc1, as shown in FIG. 11, may be observed.

Figure 12:
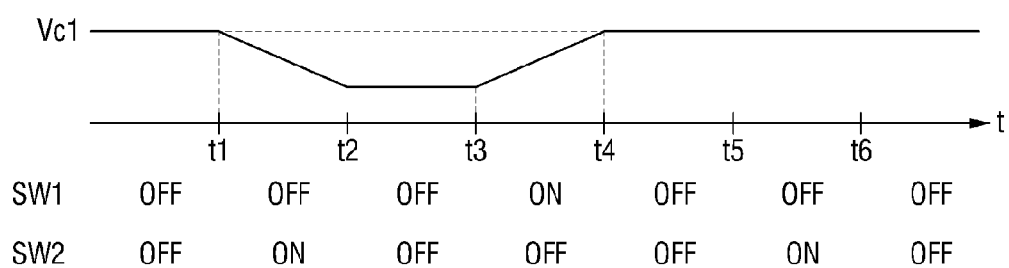

Referring to FIG. 12, a change in the first capacitor voltage Vc1 in the case where the first switch SW1 is broken down due to an open state at time t5 is illustrated.

First, during the time interval between t1 and t2, if the first switch SW1 is maintained in an OFF state and the second switch SW2 is changed into an ON state, electric charges charged in the first capacitor (C1 of FIG. 1) may be discharged and the first capacitor voltage Vc1 may decrease. Thereafter, if the second switch SW2 is changed back into an OFF state during the time interval between t2 and t3, the first capacitor (C1 of FIG. 1) may not be discharged any more, and the first capacitor voltage Vc1 may be maintained at a constant level. In addition, if the first switch SW1 is changed into an ON state during the time interval between t3 and t4, the electric charges supplied from the first power supply (V1 of FIG. 1) may charge the first capacitor (C1 of FIG. 1) and the first capacitor voltage Vc1 may increase again. Next, if the first switch SW1 is changed again into an OFF state during a time interval between t4 and t5, the first capacitor (C1 of FIG. 1) may not be charged any more, and the first capacitor voltage Vc1 may be maintained at a constant level. However, if the second switch SW2 goes to an open state at time t5, the first capacitor voltage Vc1 may not be reduced, irrespective of whether the second switch SW2 is changed into an ON state during a time interval between t5 and t6. That is to say, even when the first and second switches SW1 and SW2 are turned on or off after time t3, a change in the first capacitor voltage Vc1 may not be observed.

Consequently, in FIG. 12, a normal change in the first capacitor voltage Vc1, as shown in FIG. 9, may not be observed, thereby detecting a fault of the first switch SW1.

The fault tolerance control system according to the embodiment of the present disclosure may have features that the fault tolerance control system may control fault tolerance using simplified configurations of the first to fourth switches SW1 to SW4. In addition, according to the present disclosure, to the fault tolerance control system may suppress a discharge current from sharply increasing when a broken controller is separated from the system, by additionally providing the third capacitor C3. In addition, an additional component, such as a dynamic brake, may not be required.

In addition, the reliability of a fault tolerance controlling function can be increased by detecting faults of the first to fourth switches SW1 to SW4 additionally provided to control the fault tolerance. Further, the fault tolerance control system according to the embodiment of the present disclosure can control the fault tolerance with respect to various types of faults, e.g., an open state, a short state, an arm short state, or a power failure of a transistor element.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims. It is therefore desired that the present embodiments be considered in all respects as illustrative and not restrictive, reference being made to the appended claims rather than the foregoing description to indicate the scope of the present disclosure.

What is claimed is:

1. A fault tolerance control system comprising:
   a driver including one or more lines through which current flows;
   a current determiner including a torque table, the current determiner configured to generate a first signal including information indicating an amount of current supplied to the driver based on an externally applied torque signal;
   a current controller configured to receive the first signal and to generate a second signal indicating a voltage required by the driver;
   a first controller connected to the driver and configured to control the driver;
   a power distributor configured to receive the second signal and to determine how much power output from the driver is to be distributed to the first controller based on the second signal;
   a first switch connected to the first controller;
   a first capacitor connected to the first switch;
   a second switch connected to the first capacitor;
   a first power supply connected to the first capacitor and connected to the second switch; and
   a second capacitor connected to the first switch and connected to a ground of the first power supply,
   wherein when the first controller is broken down, the second switch is configured to be turned off and to interrupt power supply of the first power supply, and the first switch is configured to be turned on and to discharge electric charges charged in the second capacitor.

2. The fault tolerance control system of claim 1, wherein the first switch includes a transistor.

3. The fault tolerance control system of claim 2, wherein a gate terminal of the transistor is connected to one end of the second capacitor and a drain terminal of the transistor is connected to an other end of the second capacitor.

4. The fault tolerance control system of claim 3, wherein the gate terminal of the transistor and the one end of the second capacitor are connected to a ground of the first power supply.

5. The fault tolerance control system of claim 3, further comprising a diode having one end connected to the gate terminal and an other end connected to a ground of the first power supply.

6. The fault tolerance control system of claim 1, further comprising:
   a second controller connected to the driver and configured to control the driver;
   a third switch connected to the second controller;
   a third capacitor connected to the third switch;
   a fourth switch connected to the third capacitor; and
   a second power supply connected to the third capacitor and connected to the fourth switch.

7. The fault tolerance control system of claim 6, further comprising a fourth capacitor connected to the third switch and a ground of the second power supply.

8. The fault tolerance control system of claim 6, wherein each of the first controller and the second controller includes a transistor.

9. The fault tolerance control system of claim 6, further comprising a switch controller configured to control the first to fourth switches.

10. The fault tolerance control system of claim 9, wherein the switch controller is configured to receive a fault signal from the first controller or from the second controller.

11. A fault tolerance control system comprising:
    a driver including one or more lines through which current flows;
    first and second controllers configured to control the driver;
    a first switch connected to the first controller;
    a first capacitor connected to the first switch;
    a second switch connected to the first capacitor;
    a first power supply connected to the first capacitor and connected to the second switch;
    a third switch connected to the second controller;
    a second capacitor connected to the third switch;
    a fourth switch connected to the second capacitor;
    a second power supply connected the second capacitor and connected to the fourth switch,
    wherein, when one of the first and second controllers is broken down, the driver is configured to be controlled by an other of the first and second controllers that is not broken down;
    a driving controller configured to control the first and second controllers; and
    a switch controller configured to control the first to fourth switches,
    wherein the first controller is configured to generate a first fault signal indicating whether the first controller is broken down,
    the second controller is configured to generate a second fault signal indicating whether the second controller is broken down, and
    the switch controller is configured to control the first to fourth switches, based on the first fault signal and/or the second fault signal.

12. The fault tolerance control system of claim 11, wherein, when the first controller is broken down and the second controller normally operates,
    the second switch is configured to be turned off and to interrupt power supply of the first power supply responsive to the switch controller,
    the first switch is configured to be turned on and to discharge electric charges charged in the first capacitor responsive to the switch controller, the third switch is configured to be maintained in an 'OFF' state responsive to the switch controller, and the fourth switch is configured to be maintained in an 'ON' state responsive to the switch controller.

13. A fault tolerance control system comprising:

a driver including one or more lines through which current flows;

first and second controllers configured to control the driver;

first and second switches connected to the first controller;

third and fourth switches connected to the second controller;

a current determiner including a torque table, the current determiner configured to generate a first signal including information indicating an amount of current supplied to the driver based on an externally supplied torque signal;

a current controller configured to receive the first signal and to generate a second signal indicating a voltage required by the driver; and a switch controller configured to control the first to fourth switches, wherein the first controller is configured to generate a first fault signal indicating whether the first controller is broken down, the second controller is configured to generate a second fault signal indicating whether the second controller is broken down, and when one of the first and second controllers is broken down, the driver is configured to be controlled by an other of the first and second controllers that is not broken down.

14. The fault tolerance control system of claim 13, further comprising a power distributor configured to receive the second signal and to generate a third signal indicating a power of the driver that is to be distributed to the first and second controllers.

15. The fault tolerance control system of claim 14, further comprising a coordinate converter configured to convert the third signal into a fourth signal, the fourth signal including a rotation coordinate signal.

16. The fault tolerance control system of claim 15, further comprising a driving controller configured to control the first and the second controllers.

17. The fault tolerance control system of claim 13, wherein, when the first controller is broken down and the second controller normally operates, the first switch is configured to be turned on and to discharge electric charges charged in a first capacitor, the second switch is configured to be turned off and to interrupt power supply of a first power supply, the third switch is configured to be maintained in an 'OFF' state, and the fourth switch is configured to be maintained in an 'ON' state.

18. The fault tolerance control system of claim 13, wherein each of the current determiner and the current controller are configured to receive the first fault signal and the second fault signal.

* * * * *